United States Patent
Chung et al.

(10) Patent No.: US 11,616,550 B2
(45) Date of Patent: Mar. 28, 2023

(54) METHOD FOR REPORTING CHANNEL STATE INFORMATION IN WIRELESS COMMUNICATION SYSTEM AND DEVICE THEREFOR

(71) Applicant: LG ELECTRONICS INC., Seoul (KR)

(72) Inventors: Jaehoon Chung, Seoul (KR); Jiwon Kang, Seoul (KR); Haewook Park, Seoul (KR); Kunil Yum, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 24 days.

(21) Appl. No.: 17/055,536

(22) PCT Filed: May 17, 2019

(86) PCT No.: PCT/KR2019/005932
§ 371 (c)(1),
(2) Date: Nov. 13, 2020

(87) PCT Pub. No.: WO2019/221549
PCT Pub. Date: Nov. 21, 2019

(65) Prior Publication Data
US 2021/0203393 A1    Jul. 1, 2021

(30) Foreign Application Priority Data
May 18, 2018  (KR) .................. 10-2018-0057467

(51) Int. Cl.
*H04B 7/06* (2006.01)
*H04B 7/0417* (2017.01)
*H04B 7/0456* (2017.01)

(52) U.S. Cl.
CPC ......... *H04B 7/0626* (2013.01); *H04B 7/0417* (2013.01); *H04B 7/0486* (2013.01); *H04B 7/0632* (2013.01); *H04B 7/0639* (2013.01)

(58) Field of Classification Search
CPC .. H04B 7/0626; H04B 7/0417; H04B 7/0486; H04B 7/0632; H04B 7/0639; H04B 7/065; H04B 7/063; H04B 7/0478
See application file for complete search history.

(56) References Cited

U.S. PATENT DOCUMENTS

2012/0327874 A1* 12/2012 Eriksson ............... H04L 1/0035
                                                          370/329
2014/0086092 A1  3/2014 Chen et al.
(Continued)

OTHER PUBLICATIONS

Ericsson,"Corrections and clarifications for CSI reporting" 3GPP TSG-RAN WG1 #93, R1-1806216, May 2018, 19 pages.
(Continued)

*Primary Examiner* — Minh Trang T Nguyen
(74) *Attorney, Agent, or Firm* — Lee, Hong, Degerman, Kang & Waimey PC

(57) ABSTRACT

A method for a user equipment (UE) to report channel state information in a wireless communication system is disclosed. The method comprises if a plurality of bandwidth parts (BWPs) is configured for a reporting of the channel state information, constructing the channel state information based on at least one representative channel state information element per each bandwidth part, and reporting the channel state information to a base station, wherein the channel state information includes first channel state information including enhanced wideband per BWP (eWB) commonly related to channel state information of the plurality of bandwidth parts, and second channel state information related to channel state information of each bandwidth part included in the plurality of bandwidth parts.

13 Claims, 8 Drawing Sheets

```
Construct first channel state information  —S110
                    ↓
Construct second channel state information —S120
```

(56) References Cited

U.S. PATENT DOCUMENTS

| | | | | |
|---|---|---|---|---|
| 2015/0085763 | A1* | 3/2015 | Gao | H04L 5/0035 |
| | | | | 370/329 |
| 2016/0164589 | A1 | 6/2016 | Han et al. | |
| 2017/0034855 | A1 | 2/2017 | Sohn et al. | |
| 2018/0255566 | A1* | 9/2018 | Takeda | H04L 5/001 |
| 2022/0201672 | A1* | 6/2022 | Tomeba | H04W 16/28 |

OTHER PUBLICATIONS

CATT,"Remaining issues on CSI reporting" 3GPP TSG-RAN WG1 #93, R1-1806279, May 2018, 5 pages.
PCT International Application No. PCT/KR2019/005932, International Search Report dated Sep. 17, 2019, 6 pages.

* cited by examiner

【FIG. 1】
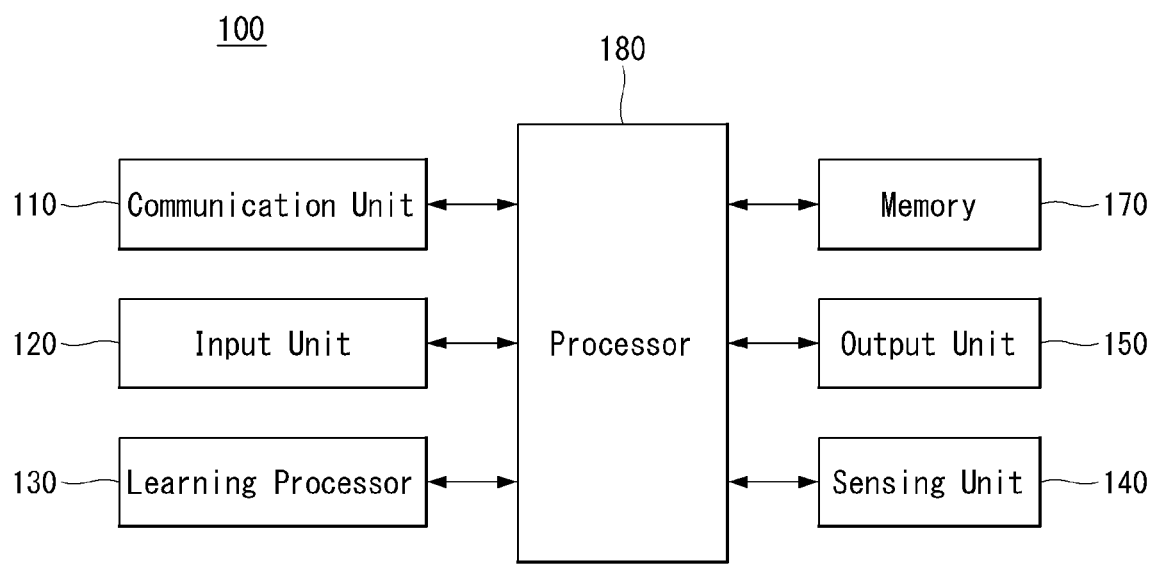
【FIG. 2】
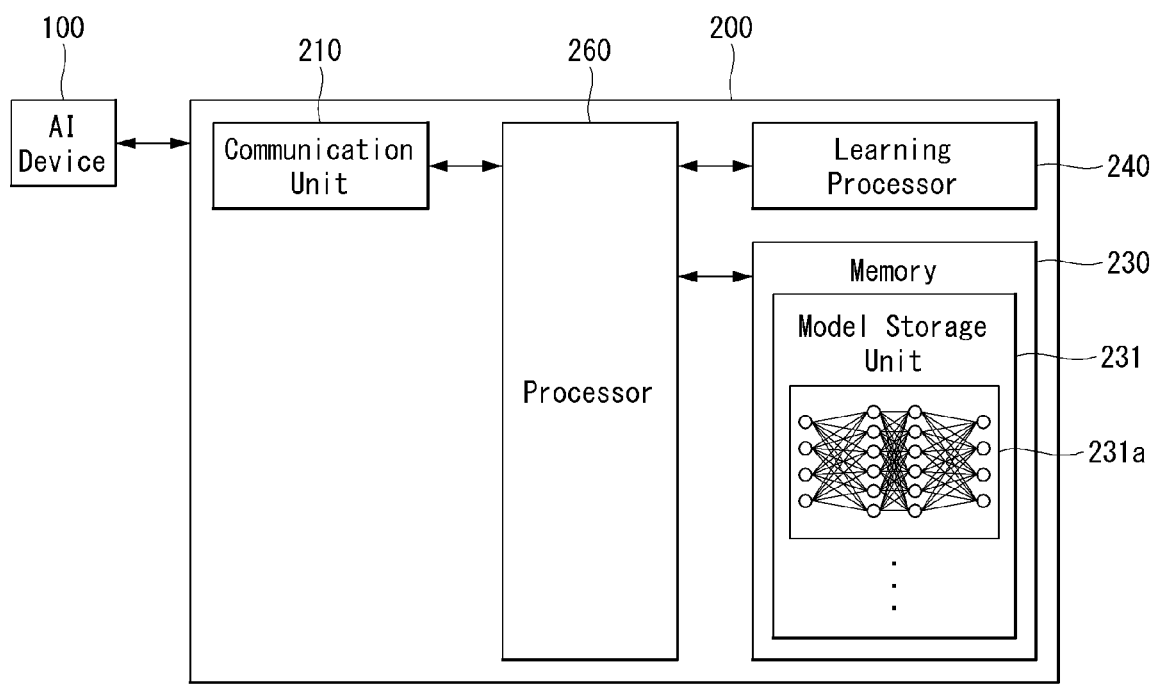

[FIG. 3]
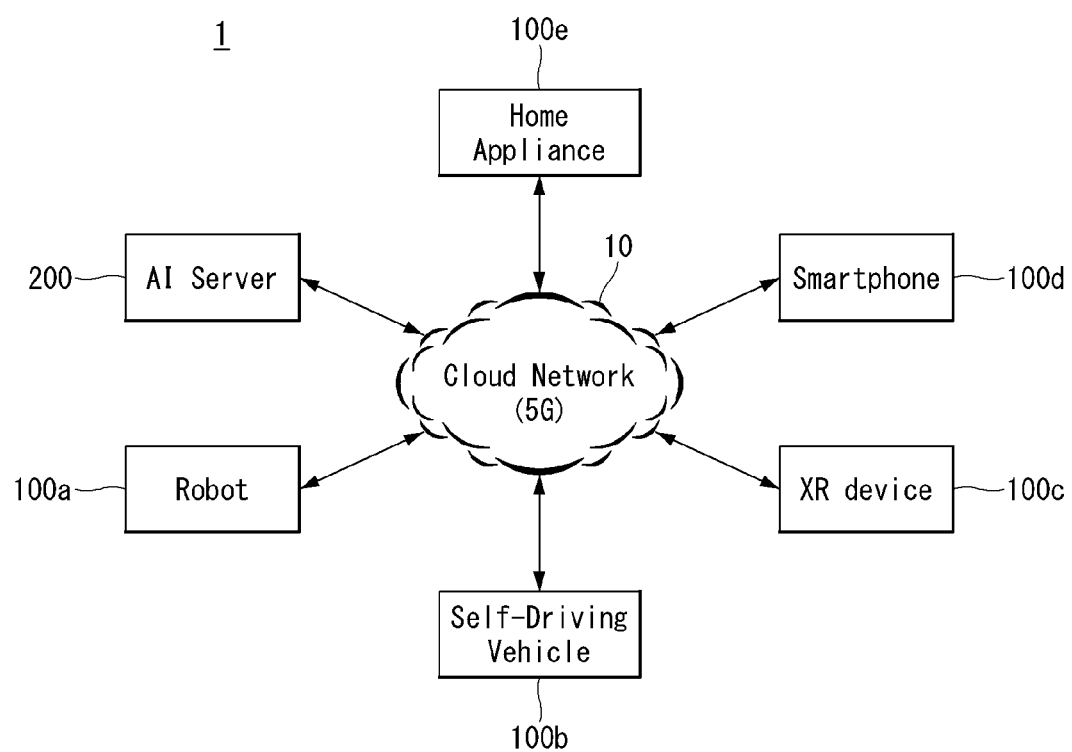

【FIG. 4】
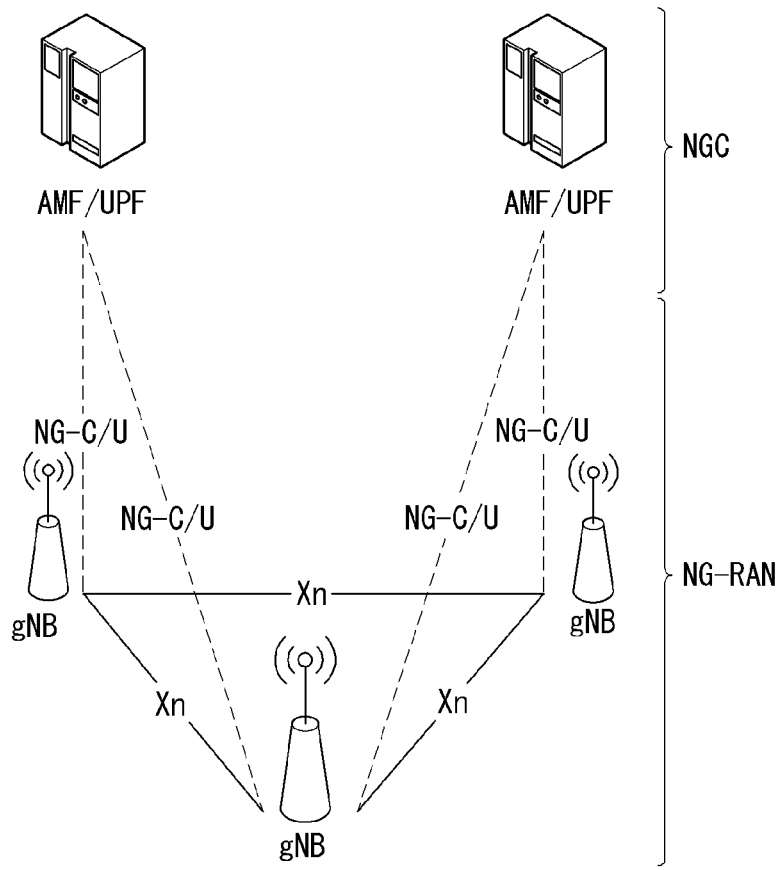
【FIG. 5】
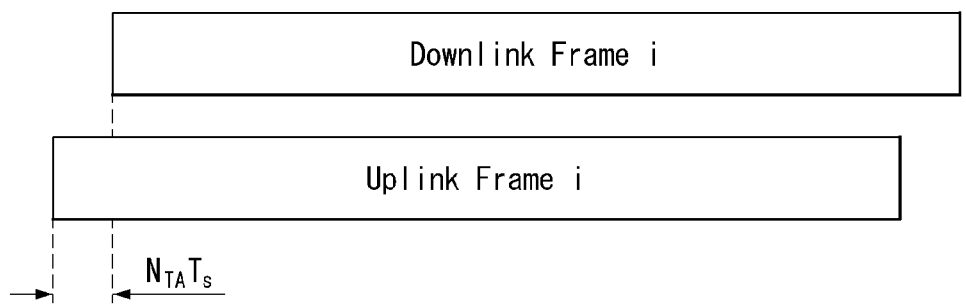

[FIG. 6]
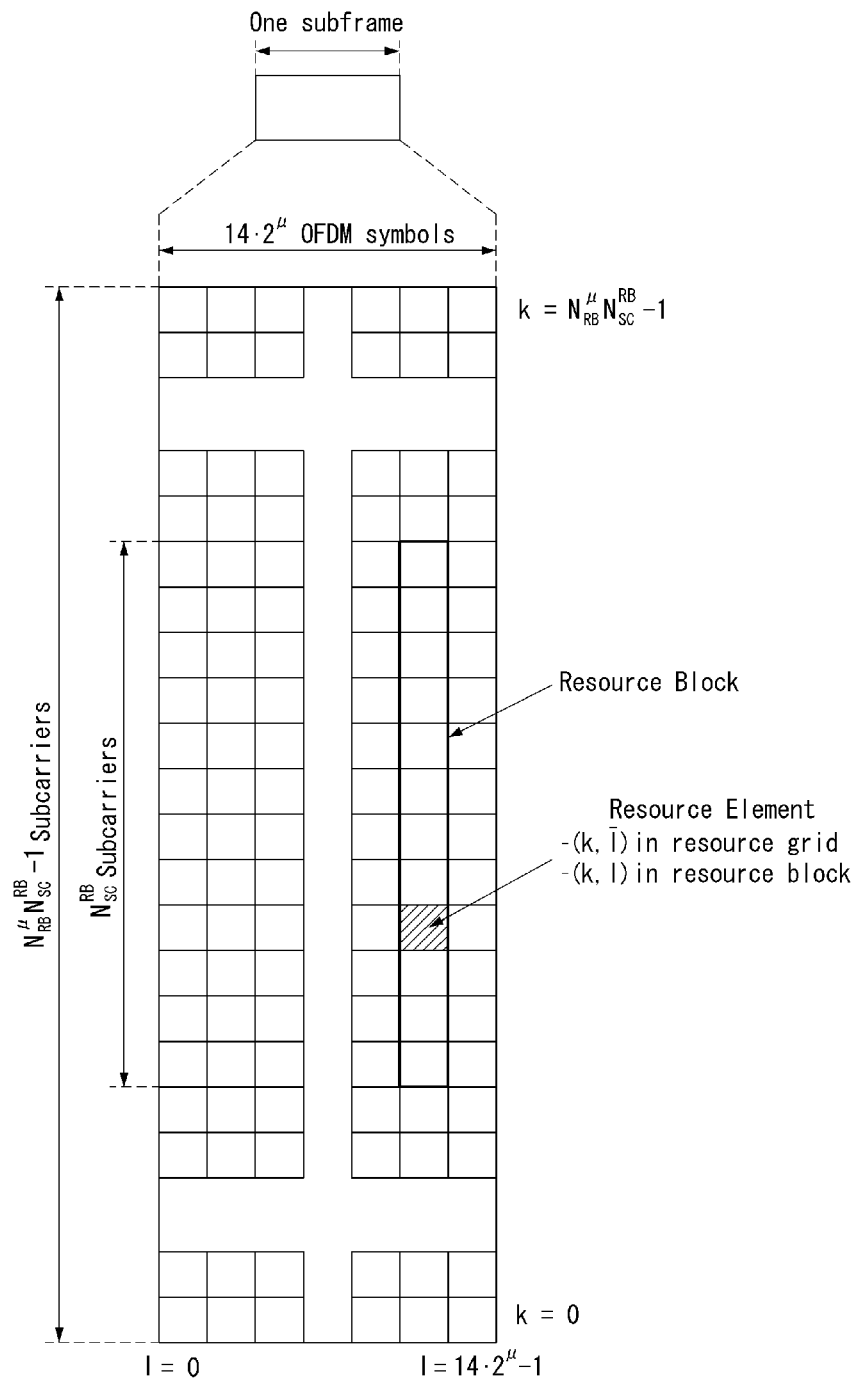

[FIG. 7]
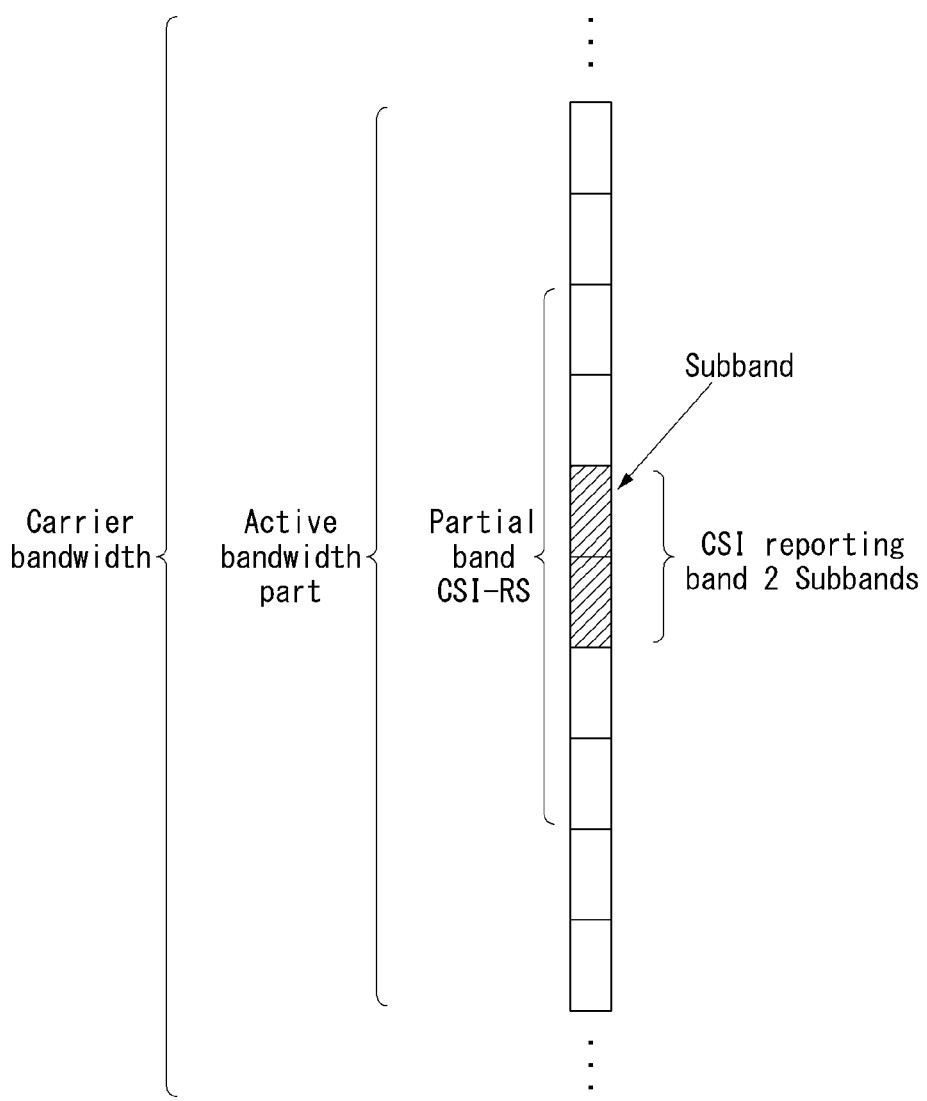

【FIG. 8】
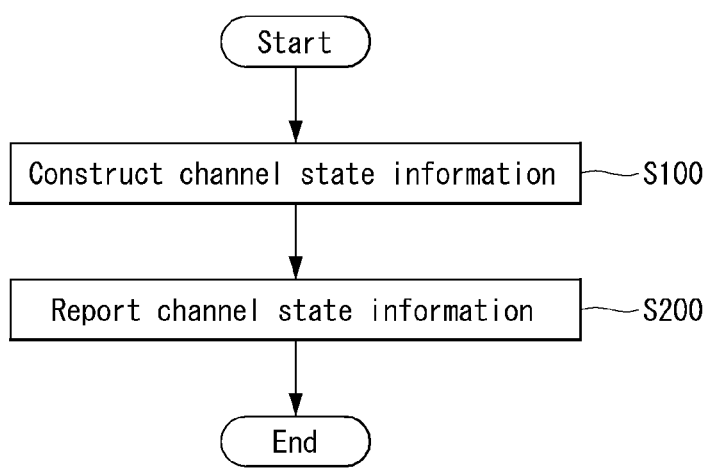
【FIG. 9】
```
        Start
          │
          ▼
Construct channel state information  — S100
          │
          ▼
Report channel state information  — S200
          │
          ▼
         End
```

[FIG. 10]
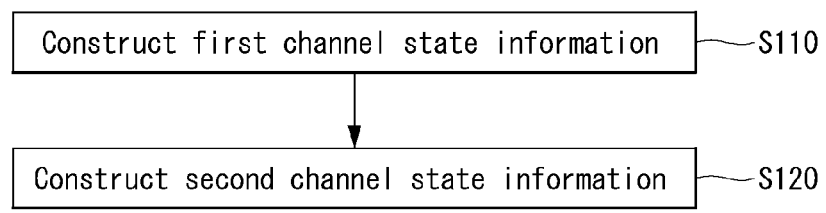
[FIG. 11]
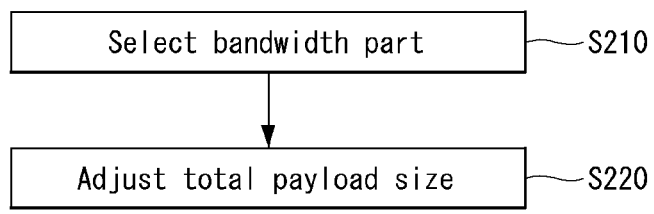

[FIG. 12]
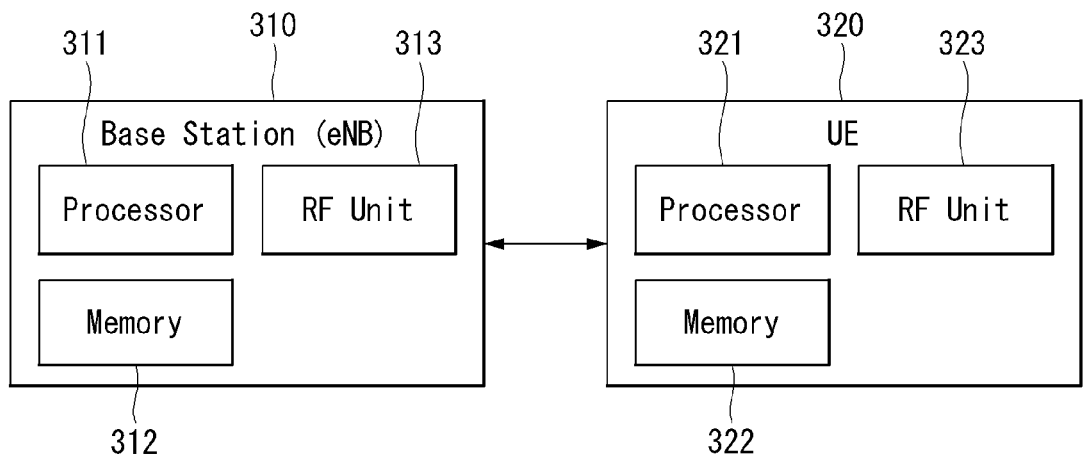
[FIG. 13]
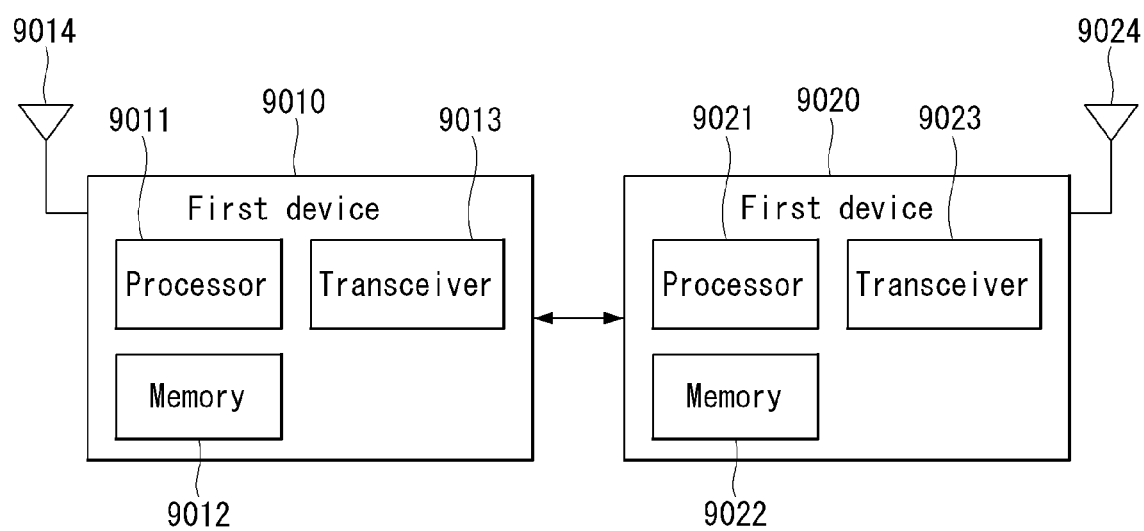

METHOD FOR REPORTING CHANNEL STATE INFORMATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2019/005932, filed on May 17, 2019, which claims the benefit of earlier filing date and right of priority to Korean Application No. 10-2018-0057467, filed on May 18, 2018, the contents of which are all incorporated by reference herein in their entirety.

TECHNICAL FIELD

The present disclosure relates to a method for reporting channel state information in a wireless communication system and a device therefor.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DISCLOSURE

Technical Problem

An object of the present disclosure is to provide a method for performing more efficiently channel state reporting when a plurality of bandwidth parts is configured for reporting of channel state information.

Another object of the present disclosure is to provide a signalling scheme for efficiently performing channel state reporting when a plurality of bandwidth parts is configured for reporting of channel state information, and configurations of the respective bandwidth parts included in the plurality of bandwidth parts are different.

Another object of the present disclosure is to report channel state information considering a total payload size when a plurality of bandwidth parts is configured for reporting of channel state information.

The technical problems of the present disclosure are not limited to the aforementioned technical problems, and other technical problems which are not mentioned above will be apparently appreciated by a person having ordinary skill in the art from the following description.

Technical Solution

In one aspect of the present disclosure, there is provided a method for a user equipment (UE) to report channel state information in a wireless communication system, the method comprising if a plurality of bandwidth parts (BWPs) is configured for a reporting of the channel state information, constructing the channel state information based on at least one representative channel state information element per each bandwidth part, and reporting the channel state information to a base station, wherein the channel state information includes first channel state information including enhanced wideband per BWP (eWB) commonly related to channel state information of the plurality of bandwidth parts, and second channel state information related to channel state information of each bandwidth part included in the plurality of bandwidth parts.

Constructing the channel state information comprises constructing, by the UE, the first channel state information using the eWB, and constructing, by the UE, the second channel state information using a differential value between an element included in the channel state information of each bandwidth part and an element included in the first channel state information.

The channel state information includes at least one of a channel quality indicator (CQI), a precoding matrix index (PMI), or a rank indicator (RI), as a component. The eWB is a mean value of each of components included in the channel state information of the plurality of bandwidth parts.

The eWB is channel state information of a bandwidth part with a reference index among the plurality of bandwidth parts.

The reference index corresponds to one of a lowest index, a highest index, and a mid index among respective indexes of the plurality of bandwidth parts.

The plurality of bandwidth parts include at least one of an active bandwidth part and an inactive bandwidth part for a measurement of the channel state information.

The eWB is previous channel state information of a bandwidth part which becomes inactive within a pre-configured time from a current time among the plurality of bandwidth parts.

Constructing the first channel state information comprises constructing, by the UE, the first channel state information using the eWB according to a channel correlation of the plurality of bandwidth parts. The eWB is a mean value of each of components included in the channel state information of the plurality of bandwidth parts when the channel correlation is less than a pre-configured threshold value. The eWB is channel state information of a bandwidth part with a reference index among the plurality of bandwidth parts when the channel correlation is equal to or greater than the pre-configured threshold value.

If a component included in the channel state information is different for each bandwidth part, the second channel state information includes information indicating the component of the channel state information of each bandwidth part.

The information indicating the component of the channel state information of each bandwidth part includes binary values individually indicating whether each component of the channel state information is included.

The information indicating the component of the channel state information of each bandwidth part includes an index value of a component excluded from the channel state information of each bandwidth part.

Reporting the channel state information comprises if a size of the channel state information exceeds a total payload size, adjusting the size of the channel state information according to the total payload size and transmitting the channel state information.

Reporting the channel state information comprises selecting, by the UE, at least one of the plurality of bandwidth parts, and transmitting, by the UE, channel state information except second channel state information for the selected bandwidth part.

The selected bandwidth part is a bandwidth part with a low priority according to a channel state among the plurality of bandwidth parts, or a bandwidth part in which a value of a component included in the second channel state information is less than a pre-configured threshold value.

In another aspect of the present disclosure, there is provided a user equipment (UE) reporting channel state information in a wireless communication system, the UE comprising a transmitter configured to transmit a radio signal, a receiver configured to receive the radio signal, and a processor configured to control the transmitter and the receiver, wherein the processor is configured to construct the channel state information based on at least one representative channel state information element per each bandwidth part (BWP), and report the channel state information to a base station, wherein the channel state information includes first channel state information including enhanced wideband per BWP (eWB) commonly related to channel state information of the plurality of bandwidth parts, and second channel state information related to channel state information of each bandwidth part included in the plurality of bandwidth parts.

The processor is configured to construct the first channel state information using the eWB, and construct the second channel state information using a differential value between an element included in the channel state information of each bandwidth part and an element included in the first channel state information.

Advantageous Effects

A method and a device for reporting channel state information according to the present disclosure reports channel state information by dividing the channel state information into first channel state information commonly related to a plurality of bandwidth parts and second channel state information related to each bandwidth part included in the plurality of bandwidth parts. Thus, the present disclosure in which the plurality of bandwidth parts are configured for the reporting of the channel state information can increase a performance in terms of channel information accuracy and overhead reduction, compared to a case of independently reporting channel state information in each bandwidth part.

According to the present disclosure, the second channel state information includes information indicating a component of channel state information of each bandwidth part if configuration of channel state information is different for each bandwidth part. Thus, the present disclosure can construct first channel state information and second channel state information even if configuration of channel state information of each bandwidth part is different, and thus can report channel state information while efficiently reducing an overhead.

The present disclosure excludes second channel state information of a bandwidth part selected depending on a pre-configured criteria if channel state information configured in a state, in which the plurality of bandwidth parts are configured for the reporting of the channel state information, exceeds the total payload size. Thus, the present disclosure can minimize a reduction in accuracy of channel state information even if the size of channel state information is adjusted.

Advantages which can be obtained in the present disclosure are not limited to the aforementioned effects and other unmentioned advantages will be clearly understood by those skilled in the art from the following description.

DESCRIPTION OF DRAWINGS

FIG. 1 illustrates an AI device 100 according to an embodiment of the present disclosure.

FIG. 2 illustrates an AI server 200 according to an embodiment of the present disclosure.

FIG. 3 illustrates an AI system 1 according to an embodiment of the present disclosure.

FIG. 4 illustrates an example of an overall structure of a NR system to which a method proposed by the present specification is applicable.

FIG. 5 illustrates a relation between an uplink frame and a downlink frame in a wireless communication system to which a method proposed by the present specification is applicable.

FIG. 6 illustrates an example of a resource grid supported in a wireless communication system to which a method proposed by the present specification is applicable.

FIG. 7 illustrates a bandwidth part activated for channel state reporting.

FIG. 8 illustrates a comparison of a naïve method and a method according to the present disclosure, which report channel state information, when multiple bandwidth parts are active.

FIG. 9 is a flow chart illustrating a method for reporting channel state information according to an embodiment of the present disclosure.

FIG. 10 is a flow chart illustrating in detail a step of constructing channel state information according to an embodiment of the present disclosure.

FIG. 11 is a flow chart illustrating in detail a step of transmitting channel state information according to an embodiment of the present disclosure.

FIG. 12 illustrates a block configuration diagram of a device reporting channel state information according to another embodiment of the present disclosure.

FIG. 13 illustrates a wireless communication device according to another embodiment of the present disclosure, to which methods described in the present disclosure are applicable.

MODE FOR INVENTION

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A/NR is primarily described for clear description, but technical features of the present invention are not limited thereto.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

The present disclosure described below can be implemented by combining or modifying respective embodiments to meet the above-described requirements of 5G.

The following describes in detail technical fields to which the present disclosure described below is applicable.

<Artificial Intelligence (AI)>

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

<Robot>

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

<Self-Driving (Autonomous-Driving)>

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

<Extended Reality (XR)>

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™ radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 2 illustrates an AI server 200 according to an embodiment of the present disclosure.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 illustrates an AI system 1 according to an embodiment of the present disclosure.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

<AI+Robot>

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

<AI+Self-Driving>

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

<AI+XR>

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

<AI+Robot+Self-Driving>

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

<AI+Robot+XR>

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

<AI+Self-Driving+XR>

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

DEFINITION OF TERMS eLTE eNB: An eLTE eNB is an evolution of an eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 reference points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

System General

FIG. 4 illustrates an example of an overall structure of a new radio (NR) system to which a method proposed by the present specification is applicable.

Referring to FIG. 4, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$, where $\Delta f_{max}=480 \cdot 10^3$, and $N_f=4096$. Downlink and uplink transmissions are organized into radio frames with a duration of $T_f=(\Delta f_{max} N_f/100) \cdot T_s=10$ ms. The radio frame consists of ten subframes each having a section of $T_{sf}=(\Delta f_{max} N_f/1000) \cdot T_s=1$ ms. In this case, there may be a set of frames in the uplink and a set of frames in the downlink.

FIG. 5 illustrates a relation between a UL frame and a DL frame in a wireless communication system to which a method proposed by the present disclosure is applicable.

As illustrated in FIG. 5, a UL frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe, and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology in use and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 represents the number of OFDM symbols $N_{symb}^{slot}$ in a normal CP, the number of slot $N_{slot}^{frame,\mu}$ per radio frame and the number of slot $N_{slot}^{subframe,\mu}$ per subframe, and Table 3 represents the number of OFDM symbols in an extended CP, the number of slot per radio frame and the number of slot per subframe.

TABLE 2

| | Slot configuration | | | | | |
|---|---|---|---|---|---|---|
| | 0 | | | 1 | | |
| $\mu$ | $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 6 illustrates an example of a resource grid supported in a wireless communication system to which a method proposed by the present specification is applicable.

Referring to FIG. 6, a resource grid consists of $N_{RB}^{\mu} N_{sc}^{RB}$ subcarriers in a frequency domain, each subframe consisting of $14 \cdot 2^{\mu}$ OFDM symbols, but the present disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 6, one resource grid may be configured for the numerology $\mu$ and an antenna port p.

Each element of the resource grid for the numerology $\mu$ and the antenna port p is indicated as a resource element, and may be uniquely identified by an index pair (k,l). Herein, $k=0, \ldots, N_{RB}^{\mu} N_{sc}^{RB}-1$ is an index in the frequency domain, and $l=0, \ldots, 2^{\mu} N_{symb}^{(\mu)}-1$ indicates a location of a symbol in a subframe. To indicate a resource element in a slot, the index pair (k,l) is used. Herein, $l=0, \ldots, N_{symb}^{\mu}-1$.

The resource element (k,l) for the numerology $\mu$ and the antenna port p corresponds to a complex value $a_{k,l}^{(p,\mu)}$. When there is no risk of confusion or when a specific antenna port or numerology is specified, the indexes p and $\mu$ may be dropped and thereby the complex value may become $a_{k,l}^{(p)}$ or $a_{k,l}$.

In addition, a physical resource block is defined as $N_{sc}^{RB}=12$ consecutive subcarriers on a frequency domain. On the frequency domain, physical resource blocks are numbered from 0 to $N_{RB}^{\mu}-1$. A relation between a physical resource block number $n_{PRB}$ on the frequency domain and the resource elements (k,l) is given by Equation 1.

$$n_{PRB} = \left\lfloor \frac{k}{N_{sc}^{RB}} \right\rfloor \quad \text{[Equation 1]}$$

In regard to a carrier part, a UE may be configured to receive or transmit the carrier part using only a subset of the resource grid. In this instance, a set of resource blocks which the UE is configured to receive or transmit are numbered from 0 to $N_{URB}^{\mu}-1$ on the frequency domain.

Downlink Channel State Information (CSI) Feedback

In current LTE standards, there are two transmission schemes: open-loop MIMO and closed-loop MIMO operated without channel information. In the closed-loop MIMO, each of transmit and receive ends performs beamforming based on channel state information (CSI) to obtain the multiplexing gain of MIMO antenna. To obtain the CSI, a base station allocates physical uplink control channel (PUCCH) or physical uplink shared channel (PUSCH) to a UE and instructs the UE to feed back downlink CSI.

The CSI is roughly classified into three pieces of information: a rank indicator (RI), a precoding matrix index (PMI), and a channel quality indication (CQI). The RI denotes rank information of channel and refers to the number of streams that the UE receives via the same frequency time resource. This value is dominantly determined by long term fading of channel and is thus fed back from the UE to the base station typically with a longer period than the PMI and the CQI. The PMI is a value reflecting spatial characteristics of channel and denotes a precoding index of the base station that the UE prefers based on metric such as SINR. The CQI is a value denoting an intensity of channel and refers to the reception SINR that can be generally obtained when the base station uses the PMI.

In more advanced communication systems such as LTE-A, obtaining additional multi-user diversity using multi-user MIMO (MU-MIMO) has been added. To this end, higher accuracy is required from the channel feedback perspective. This reason is that in the MU-MIMO, feedback channel accuracy has a significant influence on interference with other multiplexed UEs as well as the UE having fed back due to the presence of interference channel between multiplexed UEs in the antenna domain. Thus, it has been determined in LTE-A that a final PMI is designed to be divided into W1 which is long term and/or wideband PMI and W2 which is short term and/or sub-band PMI so as to increase the feedback channel accuracy.

An example of a hierarchical codebook transformation scheme that constitutes one final PMI from two pieces of channel information is to transform a codebook using a long-term covariance matrix of channel as follows.

$$W=\text{norm}(W1\,W2)$$

In the above Equation, W2 (=short term PMI) is a codeword of a codebook created for reflecting short-term channel information, W is a codeword of a final codebook transformed, and norm(A) is a matrix in which norm per column in matrix A is normalized to 1.

The specific structures of existing W1 and W2 are as follows.

$$W1(i) = \begin{bmatrix} X_i & 0 \\ 0 & X_i \end{bmatrix},$$

where $X_j$ is Nt/2 by M matrix.

$$W2(j) = \begin{bmatrix} e_M^k & e_M^l & & e_M^m \\ & & \cdots & \\ \alpha_j e_M^k & \beta_j e_M^l & & \gamma_j e_M^m \end{bmatrix} \text{(if rank = r)},$$

where $1 \le k,l,m \le M$ and k,l,m are integer.

The codeword structure is designed to reflect the correlation characteristics of channel generated when cross polarized antennas are used and a distance between the antennas is dense (typically when a distance between adjacent antennas is equal to or less than a half of a signal wavelength). The cross polarized antennas may be divided into a horizontal antenna group and a vertical antenna group. Each antenna group has characteristics of uniform linear array (ULA) antenna, and the two antenna groups are co-located. Thus, a correlation between the antennas in each group has characteristics of the same linear phase increment, and a correlation between the antenna groups has characteristics of phase rotation. Since the codebook is a value resulting from quantizing the channel, it is required to design a codebook by applying the characteristics of channel corresponding to the source as it is.

$$W1(i)^* W2(j) = \begin{bmatrix} X_i(k) \\ \alpha_j X_i(k) \end{bmatrix}$$

In the above Equation, the codeword is represented by vectors of Nt (number of Tx antennas) by 1 and is structured with two vectors of higher vector $X_i(k)$ and lower vector $\alpha_j X_i(k)$, and each vector shows the correlation characteristics of the horizontal antenna group and the vertical antenna group. $X_i(k)$ is advantageously represented as a vector with linear phase increment by reflecting the inter-antenna correlation characteristic of each antenna group, and the DFT matrix may be used as a representative example.

Further, higher channel accuracy is necessary for CoMP. Since several base stations cooperatively transmit the same data to a specific UE in the case of CoMP JT, it may be theoretically regarded as a MIMO system in which antennas are geographically distributed. In other words, even if MU-MIMO is performed in JT, a high level of channel accuracy is required to avoid interference between the UEs co-scheduled like single cell MU-MIMO. The CoMP CB also requires accurate channel information to prevent the contiguous cells from interfering with the serving cell.

FIG. 7 illustrates a bandwidth part activated for channel state reporting.

Referring to FIG. 7, in an environment such as new RAT, an active bandwidth part (BWP) for a corresponding carrier bandwidth is applied for CSI measurement/reporting. A new radio (NR) system includes UEs supporting various bandwidths (BWs). One of purposes of the NR system is that a network (NW) flexibly schedules all the UEs.

In other words, the network needs to support flexibly signalling BW sizes (BW that the UE can support) and BW locations of the UEs, in order to optimize a transmission and reception environment of all the UEs. To this end, the UE may be configured with one or more bandwidth parts (BWPs) from the network. Herein, the BWPs may have various (or different) sizes or the same size.

As elements constituting each BWP, a bandwidth size, a frequency location, numerology, a BWP identifier (ID), etc. may be included. The UE may communicate with the network using one or multiple BWP(s) of the configured BWPs.

It has been determined in NR phase-I that only one BWP is activated and used at a time, and it may be applied as a method for selecting a BWP to actually use among a plurality of BWPs, that is pre-configured to the UE, through a scheme such as dynamic BWP switching. Alternatively, even if multiple active BWPs are all used without switching, it operates as a method for independently reporting CSI information of the corresponding BWP area.

This acts as a large overhead for the CSI measurement/reporting and negatively affects a system performance.

Hereinafter, when a plurality of bandwidth parts (BWPs) is configured for the purpose of reporting of channel state information (CSI), a method and a device for efficiently performing the CSI reporting are described with reference to FIGS. 8 to 13.

FIG. 8 illustrates a comparison of a naive method and a method according to the present disclosure, which report channel state information, when multiple bandwidth parts are active.

Referring to FIG. 8, it illustrates CSI reporting when multiple bandwidth parts are active.

In the naive method, a UE measures CSI, such as a rank indicator (RI), a channel quality indicator (CQI), and a precoding matrix index (PMI), for each BWP and reports all of them to a base station. In such a case, since the UE shall independently report all of redundant information and information with high correlation, it is very inefficient from a reporting overhead perspective, and it is difficult to expect a high resolution of information itself.

In the present disclosure (proposed), the UE may measure CSI of each BWP, and differentially express and transmit differential information of each BWP based on a common part for the CSI and/or CSI of a BWP that is a basis, or transmit CSI using a correlation such as co-phasing. With reference to FIG. 9, this method is described in more detail below.

FIG. 9 is a flow chart illustrating a method for reporting channel state information according to an embodiment of the present disclosure.

Method 1: if a plurality of BWPs is configured for CSI reporting, the UE reports CSI to the base station by distinguishing first CSI (common CSI) and second CSI (BWP-specific CSI) for the plurality of BWPs Referring to FIG. 9, a method for reporting channel state information according to an embodiment of the present disclosure may include a step S100 of constructing channel state information and a step S200 of transmitting the channel state information.

In the step S100, the UE constructs the channel state information in a state in which the plurality of BWPs is configured for the reporting of the channel state information. The channel state information may include first channel state information commonly related to channel state information of the plurality of BWPs, and second channel state information related to channel state information of each BWP included in the plurality of BWPs.

As above, the UE constructs channel state information using a method for configuring a common part for channel state information of the plurality of BWPs and supplementing a detailed element of each BWP, and thus can efficiently report the channel state information while reducing a CSI feedback overhead. Thus, the method requires a process of efficiently calculating the first CSI (common CSI) that is a common value for CSI configuration based on the plurality of BWPs, and hence can also calculate the second CSI (BWP-specific CSI). This is described in detail below with reference to FIG. 10.

In the step S200, the UE reports the channel state information to the base station.

As above, the method for reporting channel state information according to the present disclosure reports channel state information by distinguishing first channel state information commonly related to the plurality of BWPs and second channel state information related to each BWP included in the plurality of BWPs. Thus, the present disclosure in which the plurality of BWPs is configured for the reporting of the channel state information can increase a performance in terms of channel information accuracy and overhead reduction, compared to a case of independently reporting channel state information for each BWP.

FIG. 10 is a flow chart illustrating in detail a step of constructing channel state information according to an embodiment of the present disclosure.

Referring to FIG. 10, the step of constructing channel state information according to an embodiment of the present disclosure may include a step S110 of constructing first channel state information and a step S120 of constructing second channel state information.

As indicated by the following Table 4, the UE may distinguish and configure eWB (enhanced wideband per BWP), reference ID, WB (wideband per BWP), and subband (SB) that are parameters required for each CSI configuration when constructing first CSI (common CSI) and second CSI (BWP-specific CSI) based on a plurality of BWPs, and combinations of various CSI reporting modes may be created depending on whether there is usage information.

TABLE 4

| CSI reporting | common CSI | | | specific CSI |
| --- | --- | --- | --- | --- |
| mode | eWB | ref. ID | WB | SB |
| M1-1 | O | X | X | O |
| M1-2 | O | X | O | O |
| M2-1 | X | O | X | O |
| M2-2 | X | O | O | O |
| Naive | X | X | O | O |

Herein, the eWB refers to common elements of channel state information of the plurality of BWPs to be utilized. The elements constructing channel state information may include at least one of a CSI-RS resource indicator (CRI), a rank indicator(RI), a layer indication (LI), a channel quality indicator (CQI), and a precoding matrix indicator (PMI), or a combination thereof. The UE may choose representative values for elements of different CSI per each BWP and report them as information of the eWB. Further, the eWB may correspond to channel state information of a BWP with a reference ID to be described later. The reference ID refers to an index of a specific BWP.

[Method 1-1]

When the UE constructs first CSI (BWP-common CSI) and/or second CSI (BWP-specific CSI), the UE may configure CSI per configuration depending on the presence or absence of parameters (e.g., eWB, ref. ID, WB, SB) of CSI that is included or referenced in the corresponding CSI. That is, a CSI reporting mode utilizing the plurality of BWPs may be distinguished as in the above Table 4 through the presence or absence of CSI parameter and CSI components (e.g., RI, CQI, PMI, etc.) utilized through the corresponding parameter. Herein, each CSI component may be utilized for either the first CSI or the second CSI, and utilized simultaneously.

In particular, for PMI configuration, the UE may report a value of PMI itself, or may dividedly configure WB information and SB information and then report it. The UE may configure, as the first CSI, long-term and/or WB PMI W1 for the PMI corresponding to each BWP, and then configure, as the second CSI, short-term and/or SB PMI W2, that is a detailed value reflecting characteristics of each BWP by utilizing a LC codebook scheme that is currently considered in Type-II CSI feedback, and thus report the first CSI and the second CSI. This can contribute to improving a performance in terms of overhead and accuracy. In addition, a reporting period for W1 (first CSI) is configured to be longer than a reporting period for W2 (second CSI), and thus can reduce the overhead.

First, a CSI reporting method M1 using eWB configures, as the eWB, a representative value for different respective CSI elements per BWP to construct the first CSI (common CSI). Various methods may be used to configure the representative value, but the representative value may be calculated by averaging values per each element of CSI of the plurality of BWPs. A difference between an actual CSI value per each BWP and the eWB may be represented in a differential method to construct the second CSI (BWP-specific CSI) indicated to the SB. That is, the second CSI that is a value of CSI of a specific BWP may be efficiently represented with a relatively small number of bits using a table for a differential value between the first CSI and CSI of each BWP. In this instance, when a mean value has a value after the decimal point, the corresponding mean value may be an integer using a round function.

In addition, the CSI reporting method M1 may be divided into M1-1 and M1-2 depending on the presence or absence of WB information per each BWP, and implementations according to the M1-1 and M1-2 are as follows.

M1-1 (eWB+SB)

CSI components such as SSB-ID and L1-RSRP related to CRI, RI and beam reporting may be utilized or referenced when configuring first CSI (BWP-common CSI), and CQI and/or PMI may configure and report second CSI (BWP-specific CSI).

For the CQI, it can be represented by allocating 4 bits to a value included in first CSI (common CSI) and allocating 2 bits to a value included in second CSI (BWP-specific CSI). Besides, when representing the second CSI (BWP-specific CSI) that is a differential value, a base station and/or a UE may configure a specific number of bits, for example, 3 bits in addition to 2 bits, if necessary or desired.

M1-2 (eWB+WB+SB)

The PMI may partially divide the content constructing information, and only information of W1 may be included in first CSI (BWP-common CSI) and W2 may be reported as second CSI (BWP-specific CSI) by constructing SB over the configured and/or active BWPs.

Second, a CSI reporting method M2 using a reference index (ID) is described. An index of any one BWP among respective indexes of a plurality of BWPs is designated as a reference index. Information of CSI component of a BWP with the reference index is configured as first CSI (common CSI), and values of specific CSI elements of each of other BWPs may be configured differentially. The reference ID may correspond to one of a lowest index, a highest index, and a mid index. However, the present disclosure is not limited thereto, and the reference ID may be an index that is pre-configured considering accuracy of CSI, reduction efficiency of overhead, etc., or an index configured by the base station.

In the same manner as the M1, the CSI reporting method M2 may be divided into M2-1 and M2-2 depending on the presence or absence of WB information, and implementations according to the M2-1 and M2-2 are as follows.

M2-1 (ref. ID+SB)

An example is described in which a plurality of BWPs to be used in CSI reporting is a total of 3. In a situation in which respective indexes of the plurality of BWPs are 1, 5 and 8, CSI in each BWP measured by the UE may be represented as follows: RI={2, 1, 2}, CQI={7, 14, 3}. Herein, CSI of each BWP is sequentially enumerated from CSI of the BWP with a lowest index.

When the UE and the base station calculate first CSI (common CSI) based on the lowest index "1" among the respective indexes (1, 5, 8) of the plurality of BWPs, information that is the first CSI (common CSI) is [RI: 2, CQI: 7].

When calculating second CSI (specific CSI), the UE and the base station may construct, as the second CSI, [−1, 7] and [0, −4] that are differential values between the first CSI ([RI: 2, CQI: 7]) and CSI (RI={1, 2}, CQI={14, 3}) of the BWPs (indexes 5 and 8), and may report the second CSI.

M2-2 (ref. ID+WB+SB)

In the above example, in the case of PMI, W1 information of Type-II form may be configured to WB to construct first CSI (common CSI), and W2 information may be indicated to SB to construct second CSI (specific CSI).

In addition to the above content, the UE and the base station may previously promise and operate the fact that each CSI element is included in first CSI (BWP-common CSI) and/or second CSI (BWP-specific CSI), or the UE may configure and report the fact and may configure a reporting period therefor.

[Method 1-2]

For a plurality of BWPs for CSI configuration, it is possible to perform configuration per feedback for CSI reporting by including inactive BWP(s) as well as configured and/or active BWPs.

For a BWP reference for CSI reporting of the UE, when periodic or semi-persistent CSI-RS is configured to each BWP, channel state information may be constructed as follows.

If a time at which the corresponding BWP changes from an active state to an inactive state is a specific time determined by the UE and the base station or belongs to a pre-configured duration from a current time, first CSI (common-CSI) and/or second CSI (BWP-specific CSI) may be currently configured combinedly based on previous CSI measurement information of the corresponding BWP. This can be equally applied even if aperiodic CSI-RS is configured to each BWP.

As a detailed example, DL BWP IDs are designated in the CSI reporting configuration, or an index of the corresponding BWP is designated as the reference ID when a time at which the BWP is changed to the inactive state is a specific time or belongs to a pre-configured duration from a current time as described above, and thus can be used in CSI configuration and reporting.

However, when PUSCH and PUCCH resources for CSI feedback are insufficient, transmission for the active BWP is prioritized. That is, CSI omission, etc. according to the inactive BWP may be preferentially applied so that sizes of the configured PUSCH and PUCCH resources can be adjusted.

[Method 1-3]

This method may estimate AoD or AoA and corresponding angular spread through a reference signal of each BWP, and replace W1 using long-term attribute of this information to construct first CSI. In mmWave environment using multiple antenna ports, there is a channel angular property of uplink and downlink according to the corresponding BWP. Thus, unlike a method for explicitly reporting information of W1 for configuration of the first CSI or reporting it through an index according to a specific codebook, the UE and the base station may configure W1 through a promised method by reporting the parameters.

[Method 1-4]

First, first CSI (common CSI) may be calculated considering a channel correlation of a plurality of BWPs.

1) When the channel correlation is less than a pre-configured threshold value, the first CSI (common CSI) may be calculated using a representative value (eWB, e.g., mean value of each CSI element value).

2) When the channel correlation is equal to or greater than the pre-configured threshold value, this method may configure CSI of a specific BWP with a reference ID as first CSI (common CSI). In this case, since values (e.g., CQI, RI, etc.)

of CSI of the respective BWPs are similar, this method can reduce a payload used to report second CSI (specific CSI) that is a differential value The channel correlation may be obtained through a covariance matrix between the respective BWPs. Specifically, when a channel of a first BWP BWP #1 is h1 and a channel of a second BWP BWP #2 is h2, the channel correlation is calculated as E[h1'*h2].

Thus, in order to select the calculation method of the first CSI (common CSI), a channel correlation value between pre-obtained bandwidths may be used, or a channel measurement may be performed based on a specific duration to use the calculated channel correlation.

The pre-configured threshold value may be configured as a detailed value considering accuracy of channel information and CSI reporting efficiency (overhead reduction, etc.).

As above, this method adaptively selects the calculation method of the first CSI (common CSI) depending on the channel correlation of the plurality of BWPs and thus can increase the CSI reporting efficiency.

[Method 2]

If CSI configuration is different for each BWP, this method may explicitly designate CSI configuration content, or may refer to a pre-configured CSI configuration method between a UE and a base station and designate it.

The method 1 assumes that all of RI, CQI, and PMI are included as components of CSI of all the BWPs. However, if components of CSI are different for each BWP, there may occur a problem when calculating first CSI (common CSI) and when calculating second CSI (BWP-specific CSI) according to this. For example, RI and PMI may be configured in BWP #1, and CQI and PMI may be configured in BWP #2.

[Method 2-1]

This method explicitly indicates whether there is a configuration for RI, CQI, and PMI, that are components of channel state information, using a binary value, and the BWPs including the same component for the components RI, CQI, and PMI construct first CSI (common CSI) and second CSI (BWP-specific CSI) using the method 1.

That is, all the first CSI (common CSI) and the second CSI (BWP-specific CSI) pre-configure configuration information before designating values of configuration content of the first CSI (common CSI) and the second CSI (BWP-specific CSI), and thus can solve a problem generated by a difference of the configuration.

The first CSI (common CSI) is configured as a mean value of each of the component values (RI, CQI, PMI) of the BWP having the same component. The second CSI (BWP-specific CSI) may operate in a method for reporting a differential value after allocating configuration information.

As a detailed example, in a situation in which the plurality of BWPs is a total of three, and the corresponding indexes are 1, 5, and 8, it is assumed that CSI in each BWP measured by the UE is summarized in the following Table 5.

TABLE 5

| BWP index | CSI element | | |
|---|---|---|---|
| | RI | CQI | PMI |
| 1 | 2 | — | ○ |
| 5 | 1 | 14 | — |
| 8 | — | 3 | ○ |

In such a case, if only the CSI elements that are included as the component of channel state information are calculated using the method 1 and construct the first CSI (common CSI), RI_mean=2, CQI_mean=9, the PMI is W1_mean by utilizing channel state information of BWP #1 and BWP #8, and the first CSI (common CSI) is [RI_mean, CQI_mean, W1_mean]. The RI_mean is (2+1)/2=1.5 and the CQI_mean is (14+3)/2=8.5, but they are integerized using a round function and are 2 and 9, respectively.

In this instance, the second CSI (BWP-specific CSI) is as below.

CSI #1=[{1,0,1},0,*W*2 #1]

Since CSI #1 includes only RI and PMI as the component of channel state information, RI and PMI are indicated as 1 among binary values. The CQI that is not included as the component is indicated as 0 among binary values. Thus, information indicating the component of channel state information of CSI #1 is {1,0,1}. The remaining value corresponds to RI and PMI and is specifically a differential value between the channel state information of CSI #1 and the first CSI.

CSI #5=[{1,1,0},−1,5]

Since CSI #5 includes only RI and CQI as the component of channel state information, information indicating the component of channel state information of CSI #5 is {1, 1, 0}. The remaining value corresponds to RI and CQI and is specifically a value by subtracting value of RI_mean, CQI_mean (2, 9) included in the first CSI from RI, CQI (1, 14) included in the CSI of CSI #5.

The second CSI of CSI #8 is [{0, 1, 1}, −6, W2 #8] through the method described above.

[Method 2-2]

If order and elements for CSI configuration are previously promised between the base station and the UE, a difference of CSI configuration may be determined by indexing CSI components and configuring indexes for elements that are not reported. That is, this method may perform the efficient reporting by taking a method of indicating and sending only indexes of CSI elements that are excluded after determining indexes and order of RI, CQI, and PMI, for example, 1, 2, 3. In the above example, since CQI is excluded in CSI #1, indicator 2 may be selected, 3 may be configured in CSI #5, and 1 may be configured in CSI #8.

According to the above examination, the steps S110 and S120 are described in detail.

In the step S110, the UE may construct first CSI using eWB (enhanced wideband per BWP) commonly related to channel state information of the plurality of BWPs. The channel state information may include at least one of a channel quality indicator (CQI), a precoding matrix indicator (PMI), and a rank indicator (RI) as a component.

According to an embodiment, the eWB may be a mean value of each of components included in the channel state information of the plurality of BWPs.

According to an embodiment, the eWB may be channel state information of a BWP with a reference index among the plurality of BWPs. The reference index may correspond to one of a lowest index, a highest index, and a middle index among respective indexes of the plurality of BWPs.

According to an embodiment, the plurality of BWPs configured for reporting of the channel state information may include at least one of an active BWP and an inactive BWP for measurement of the channel state information. In this instance, the eWB may be previous channel state information of a BWP which becomes inactive within a pre-configured time from a current time among the plurality of BWPs.

According to an embodiment, the eWB may be a mean value of each of components included in channel state information of the plurality of BWPs when a channel correlation of the plurality of BWPs is less than a pre-configured threshold value, and may be channel state information of a BWP with a reference index among the plurality of BWPs when the channel correlation is equal to or greater than the pre-configured threshold value.

In the step S120, the UE may include a step of constructing second channel state information using a differential value between an element included in channel state information of each BWP and an element included in first channel state information.

According to an embodiment, if a component included in channel state information is different for each BWP, it may include binary values individually indicating whether each component of the channel state information is included.

According to an embodiment, information indicating a component of channel state information of each BWP may include an index value of a component excluded in channel state information of each BWP.

As described above, according to the present disclosure, the second CSI includes information indicating the component of channel state information of each BWP if configuration of channel state information is different for each BWP. Thus, the present disclosure can configure first channel state information and second channel state information even if the plurality of BWPs is configured for reporting of channel state information and configuration of channel state information of each BWP is different, thereby reporting channel state information while efficiently reducing an overhead.

The above-described method assumes that there are no special restrictions on a payload size for the CSI reporting overhead. Thus, if a total payload size is configured in reporting of channel state information for the plurality of BWPs, there is a need to additionally consider this. This is described below.

[Method 3]

If a CSI reporting overhead exceeds a total payload size, a UE may configure whether to use a specific BWP and how to report the specific BWP and report them to a base station.

[Method 3-1]

This method may exclude CSI reporting of a specific BWP with reference to a value of CSI component, or may be configured to reflect a previously reported value as it is. The UE may exclude reporting of CSI of a BWP, among active BWPs, of which a channel state is not better or has a lower priority than other BWPs through a reference for RI and/or CQI, and may indicate an index of the corresponding BWP.

As a detailed example, for the BWP indexes 1, 5, and 8 used in the method 1-2, the UE may exclude CSI reporting of BWP #8 that is #8 with the lowest CQI, and report indication information for this, thereby performing efficient CSI reporting while reducing an overhead. Alternatively, if a previous reporting and CSI of a current state have high similarity (e.g., if a difference of a value of a specific CSI element is less than a pre-configured threshold value), it may be configured to use an existing value as it is without special reporting.

Accordingly, if for a specific BWP (e.g., BWP #8), it is excluded from reporting of channel state information or a state to operate while maintaining previous channel state information is determined as 0 and 1, indication information for this may be designated as [0, 8] or [1, 8]. Specifically, [0, 8] indicates excluding channel state information of BWP #8, and [1, 8] indicates using previous channel state information of BWP #8 as it is.

[Method 3-2]

For PMI reporting, a beam of W1 is selectively used, or an amount of feedback overhead is adjusted by adjusting a resolution of W2 component. When the UE side constructs W2 for a PMI of a specific BWP, the number of W2 components can be reduced by adjusting the number of beams of dominant W1 depending on the channel state and the priority described in the method 3-1 to thereby reduce an overhead, and also it may be configured to differently bring a quantization degree of a real/imaginary part or a magnitude/phase part of a component in a complex number form or to limit the number of bits for a representation of a total value.

The UE may configure the number of beams or beam indexes, the number of quantum bits of each of W2 components for combining them, and symmetric/asymmetric information for quantization and may report them to the base station.

The content for the adjustment of the examined payload size may specify the step S200 of transmitting channel state information and is described below with reference to FIG. 11.

FIG. 11 is a flow chart illustrating in detail a step of reporting channel state information according to an embodiment of the present disclosure.

The step S200 of reporting channel state information according to an embodiment of the present disclosure may adjust a size of channel state information according to a total payload size and transmit the channel state information, if the size of channel state information exceeds the total payload size.

Referring to FIG. 11, the transmitting step S200 may include a step S210 of selecting a bandwidth part and a step S220 of adjusting the total payload size.

In the step S210, the UE selects at least one bandwidth part of the plurality of bandwidth parts. According to an embodiment, the selected bandwidth part may be a bandwidth part with a low priority according to a channel state among the plurality of bandwidth parts, or may be a bandwidth part in which a value of a component included in the second channel state information is less than a pre-configured value.

In the step S220, the UE transmits channel state information except second channel state information for the selected bandwidth part.

As described above, the present disclosure excludes second channel state information of a bandwidth part selected depending on a pre-configured criteria if channel state information configured, in a situation in which the plurality of bandwidth parts is active, exceeds the total payload size. Thus, the present disclosure can minimize a reduction in accuracy of channel state information even if the size of channel state information is adjusted.

Overview of Device to which the Present Disclosure is Applicable

FIG. 12 illustrates a block configuration diagram of a device reporting channel state information according to another embodiment of the present disclosure.

Referring to FIG. 12, a wireless communication system includes a base station 310 and multiple UEs 320 located in an area of the base station 310.

Each of the base station 310 and the UE 320 may be represented as a wireless device.

The base station 310 includes a processor 311, a memory 312, and a radio frequency (RF) module 313. The processor 311 implements functions, processes, and/or methods described in FIGS. 1 to 11. Layers of radio interface protocol may be implemented by the processor 311. The memory 312 is connected to the processor 311 and stores various types of information for driving the processor 311. The RF module 313 is connected to the processor 311 and transmits and/or receives radio signals. Specifically, the RF module 313 may include a transmitter transmitting the radio signal and a receiver receiving the radio signal.

The UE 320 includes a processor 321, a memory 322, and a RF module 323.

The processor 321 implements functions, processes, and/or methods described in FIGS. 1 to 11. Layers of radio interface protocol may be implemented by the processor 321. The memory 322 is connected to the processor 321 and stores various types of information for driving the processor 321. The RF module 323 is connected to the processor 321 and transmits and/or receives radio signals. Specifically, the RF module 323 may include a transmitter transmitting the radio signal and a receiver receiving the radio signal.

The memories 312 and 322 may be inside or outside the processors 311 and 321 and may be connected to the processors 311 and 321 through various well-known means.

Further, the base station 310 and/or the UE 320 may have a single antenna or multiple antennas.

FIG. 13 illustrates a wireless communication device according to another embodiment of the present disclosure, to which methods described in the present disclosure are applicable.

Referring to FIG. 13, a wireless communication system may include a first device 9010 and a second device 9020.

The first device 9010 may be a base station, a network node, a transmitter UE, a receiver UE, a wireless device, a wireless communication device, a vehicle, a vehicle with an autonomous driving function, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G services, or a device related to the fourth industrial revolution field, or the like.

The second device 9020 may be a base station, a network node, a transmitter UE, a receiver UE, a wireless device, a wireless communication device, a vehicle, a vehicle with an autonomous driving function, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G services, or a device related to the fourth industrial revolution field, or the like.

For example, the UE may include a cellular phone, a smart phone, a laptop computer, a digital broadcast terminal, a personal digital assistant (PDA), a portable multimedia player (PMP), a navigator, a slate PC, a tablet PC, an ultrabook, a wearable device (e.g., a smart watch, a smart glass, a head mounted display (HMD)), or the like. For example, the HMD may be a display device worn on the head. For example, the HMD may be used to implement the VR, AR, or MR device.

For example, the drone may be a flight vehicle that flies by a radio control signal without a person being on the flight vehicle. For example, the VR device may include a device that implements an object or a background, etc. of a virtual world. For example, the AR device may include a device implemented by connecting an object or a background of a virtual world to an object or a background, etc. of a real world. For example, the MR device may include a device implemented by merging an object or a background of a virtual world with an object or a background, etc. of a real world. For example, the hologram device may include a device that records and reproduces stereoscopic information to implement a 360-degree stereoscopic image by utilizing a phenomenon of interference of light generated when two laser beams called holography meet. For example, the public safety device may include a video relay device or a video device that can be worn on the user's body. For example, the MTC device and the IoT device may be a device that does not require a person's direct intervention or manipulation. For example, the MTC device and the IoT device may include a smart meter, a vending machine, a thermometer, a smart bulb, a door lock, a variety of sensors, or the like. For example, the medical device may be a device used for the purpose of diagnosing, treating, alleviating, handling or preventing a disease. For example, the medical device may be a device used for the purpose of diagnosing, treating, alleviating or correcting an injury or a disorder. For example, the medical device may be a device used for the purpose of testing, substituting or modifying a structure or a function. For example, the medical device may be a device used for the purpose of controlling pregnancy. For example, the medical device may include a medical device, a surgical device, a (in vitro) diagnostic device, a hearing aid or a device for a surgical procedure, and the like. For example, the security device may be a device installed to prevent a possible danger and to maintain safety. For example, the security device may include a camera, CCTV, a recorder, or a black box, and the like. For example, the FinTech device may be a device capable of providing financial services, such as mobile payment. For example, the FinTech device may include a payment device, point of sales (POS), or the like. For example, the climate/environment device may include a device for monitoring and predicting the climate/environment.

The first device 9010 may include at least one processor such as a processor 9011, at least one memory such as a memory 9012, and at least one transceiver such as a transceiver 9013. The processor 9011 may perform functions, procedures, and/or methods described above. The processor 9011 may perform one or more protocols. For example, the processor 9011 may perform one or more layers of a radio interface protocol. The memory 9012 is connected to the processor 9011 and may store various types of information and/or instructions. The transceiver 9013 is connected to the processor 9011 and may be configured to transmit and receive radio signals.

The second device 9020 may include at least one processor such as a processor 9021, at least one memory such as a memory 9022, and at least one transceiver such as a transceiver 9023. The processor 9021 may perform functions, procedures, and/or methods described above. The processor 9021 may perform one or more protocols. For example, the processor 9021 may perform one or more layers of a radio interface protocol. The memory 9022 is connected to the processor 9021 and may store various types of information and/or instructions. The transceiver 9023 is connected to the processor 9021 and may be configured to transmit and receive radio signals.

The memory 9012 and/or the memory 9022 may be connected inside or outside the processor 9011 and/or the processor 9021, respectively, and may be connected to another processor through various technologies, such as a wired or wireless connection.

The first device 9010 and/or the second device 9020 may have one or more antennas. For example, an antenna 9014 and/or an antenna 9024 may be configured to transmit and receive radio signals.

The embodiments described above are implemented by combinations of components and features of the present invention in predetermined forms. Each component or feature should be considered selectively unless specified separately. Each component or feature may be carried out without being combined with another component or feature. Moreover, some components and/or features are combined with each other and can implement embodiments of the present invention. The order of operations described in embodiments of the present invention may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present invention can be implemented by various means, for example, hardware, firmware, software, or combinations thereof. When embodiments are implemented by hardware, one embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present invention can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present invention can be embodied in other specific forms without departing from essential features of the present invention. Accordingly, the aforementioned detailed description should not be construed as limiting in all aspects and should be considered as illustrative. The scope of the present invention should be determined by rational construing of the appended claims, and all modifications within an equivalent scope of the present invention are included in the scope of the present invention.

The invention claimed is:

1. A method for a user equipment (UE) to report channel state information (CSI) in a wireless communication system, the method comprising:
receiving, from a base station, configuration information for a plurality of frequency bands related to a reporting of the CSI;
constructing the CSI for the plurality of frequency bands, wherein the CSI includes at least one of a layer indicator (LI), a CSI-RS resource indicator (CRI), a channel quality indicator (CQI), a precoding matrix index (PMI), a layer 1-reference signal received power (L1-RSRP) or a rank indicator (RI); and
reporting, to the base station, the CSI,
wherein the CSI includes i) first CSI including wideband information related to the plurality of frequency bands and ii) second CSI including subband information related to each of the plurality of frequency bands,
wherein the wideband information includes at least one of a wideband CQI or a wideband PMI,
wherein the subband information includes at least one of a subband CQI or a subband PMI,
wherein, based on the plurality of frequency bands being based on a plurality of bandwidth parts (BWPs):
the wideband information is based on representative information commonly related to the plurality of BWPs and the subband information is based on differential information related to the representative information,
the first CSI is constructed based on the representative information,
the second CSI is constructed based on a differential value between an element included in the CSI of each BWP and an element included in the first CSI, and
the plurality of BWPs includes at least one of an active BWP and an inactive BWP for a measurement of the CSI.

2. The method of claim 1,
wherein the representative information is a mean value of each of elements included in the CSI of the plurality of BWPs.

3. The method of claim 1, wherein the representative information is CSI of a BWP with a reference index among the plurality of BWPs.

4. The method of claim 3, wherein the reference index is related to one of a lowest index, a highest index, and a mid index among respective indexes of the plurality of BWPs.

5. The method of claim 1, wherein the representative information is previous CSI of a BWP which becomes inactive within a pre-configured time from a current time among the plurality of BWPs.

6. The method of claim 1, wherein the representative information is related to a channel correlation of the plurality of BWPs,
wherein the representative information is a mean value of each of elements included in the CSI of the plurality of BWPs based on that the channel correlation is less than a pre-configured threshold value,
wherein the representative information is CSI of a BWP with a reference index among the plurality of BWPs based on that the channel correlation is equal to or greater than the pre-configured threshold value.

7. The method of claim 1, wherein, based on an element included in the CSI being different for each BWP, the second CSI includes information for the component of the CSI of each BWP.

8. The method of claim 7, wherein the information for the element of the CSI of each BWP includes binary values individually indicating whether each element of the CSI is included.

9. The method of claim 7, wherein the information for the element of the CSI of each BWP includes an index value of an element excluded from the CSI of each BWP.

10. The method of claim 1, wherein reporting the CSI comprises:
based on a size of the CSI exceeding a total payload size, adjusting the size of the CSI based on the total payload size and transmitting the CSI.

11. The method of claim 10, wherein reporting the CSI comprises:
  selecting, by the UE, at least one of the plurality of BWPs; and
  transmitting, by the UE, the CSI except the second CSI for the selected BWP.

12. The method of claim 11, wherein the selected BWP is a BWP with a low priority according to a channel state among the plurality of BWPs, or a BWP in which a value of an element included in the second CSI is less than a pre-configured threshold value.

13. A user equipment (UE) reporting channel state information (CSI) in a wireless communication system, the UE comprising:
  a transmitter configured to transmit a radio signal;
  a receiver configured to receive the radio signal; and
  a processor configured to control the transmitter and the receiver,
  wherein the processor is configured to:
  receive, from a base station, configuration information for a plurality of frequency bands related to a reporting of the CSI,
  construct the CSI for the plurality of frequency bands, wherein the CSI includes at least one of a layer indicator (LI), a CSI-RS resource indicator (CRI), a channel quality indicator (CQI), a precoding matrix index (PMI), a layer 1-reference signal received power (L1-RSRP) or a rank indicator (RI); and
  report, to the base station, the CSI,
  wherein the CSI includes i) first CSI including wideband information related to the plurality of frequency bands and ii) second CSI including subband information related to each of the plurality of frequency bands,
  wherein the wideband information includes at least one of a wideband CQI or a wideband PMI,
  wherein the subband information include at least one of a subband CQI or a subband PMI,
  wherein, based on the plurality of frequency bands being based on a plurality of bandwidth parts (BWPs):
  the wideband information is based on representative information commonly related to the plurality of BWPs and the subband information is based on differential information related to the representative information,
  the first CSI is constructed based on the representative information,
  the second CSI is constructed based on a differential value between an element included in the CSI of each BWP and an element included in the first CSI, and
  the plurality of BWPs includes at least one of an active BWP and an inactive BWP for a measurement of the CSI.

* * * * *